United States Patent [19]

Dooley, Jr.

[11] 4,099,253
[45] Jul. 4, 1978

[54] RANDOM ACCESS MEMORY WITH BIT OR BYTE ADDRESSING CAPABILITY

[75] Inventor: Philip G. Dooley, Jr., Bolton, Conn.
[73] Assignee: Dynage, Incorporated, Bloomfield, Conn.
[21] Appl. No.: 722,886
[22] Filed: Sep. 13, 1976
[51] Int. Cl.² .......................... G11C 7/00; G11C 8/00
[52] U.S. Cl. ..................................... 364/900; 365/230
[58] Field of Search .................................. 340/173 R

[56] References Cited

U.S. PATENT DOCUMENTS

| | | | |
|---|---|---|---|
| 3,466,611 | 9/1969 | Weinberger | 364/200 |
| 3,855,580 | 12/1974 | Lighthall et al. | 340/173 R |
| 3,858,187 | 12/1974 | Lighthall et al. | 340/173 R |

Primary Examiner—Bernard Konick
Assistant Examiner—Donald McElheny
Attorney, Agent, or Firm—McCormick, Paulding & Huber

[57] ABSTRACT

Disclosed is a random access memory particularly adapted for use in a programmable controller or other similar application wherein some data is preferably handled in the form of multi-bit words or bytes and other data is preferably handled in the form of single bits (one-bit words). The memory is comprised of at least one bank of chips or similar memory units each capable of storing one bit at each of a plurality ($2^N$) of locations addressed through N address terminals. Through the agency of control signals, the chips of the bank may be accessed either in parallel to read or write a multi-bit word or individually to read or write a single bit.

5 Claims, 4 Drawing Figures

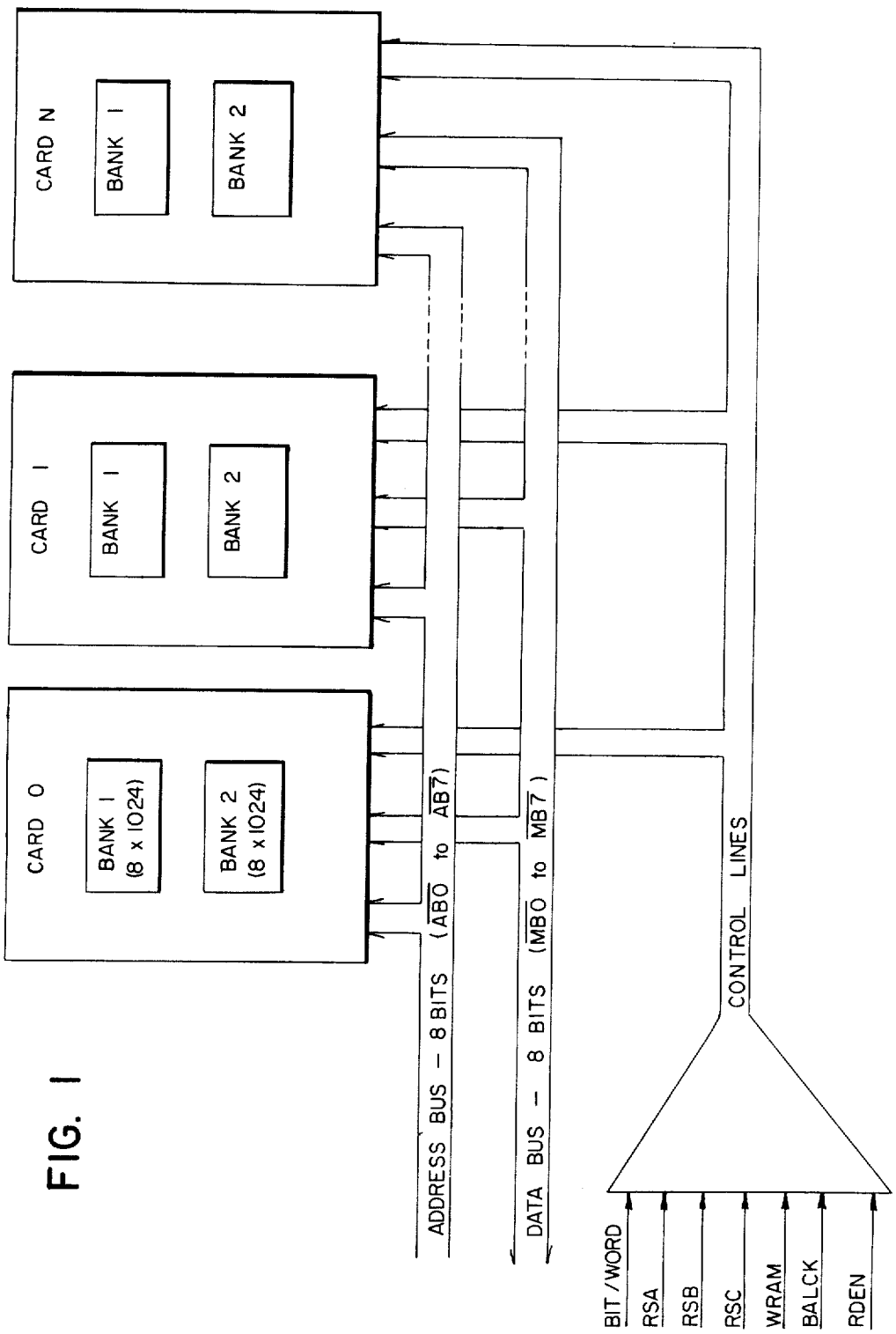

| FIG. 2A | FIG. 2B |
|---|---|

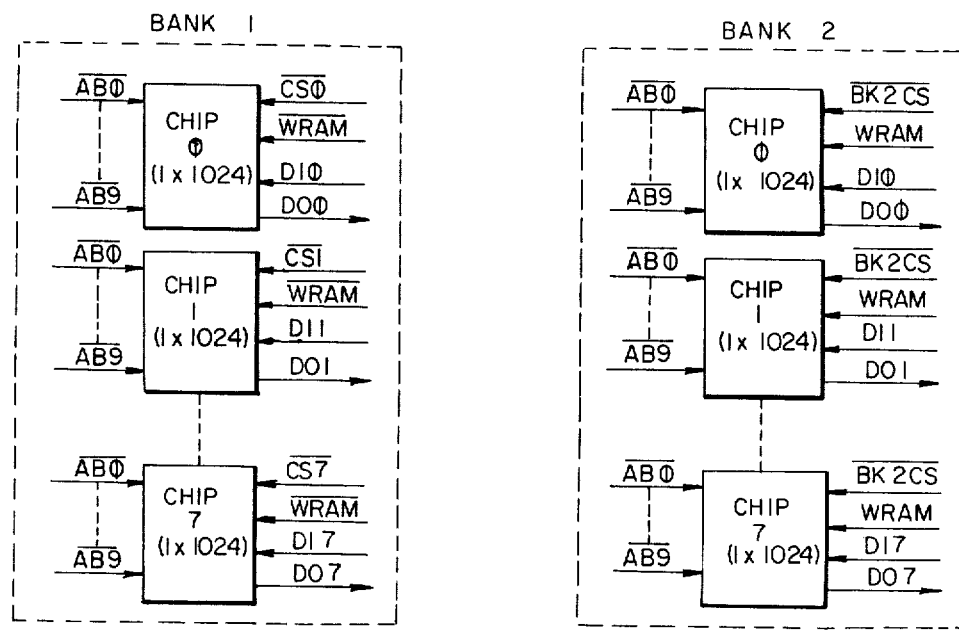
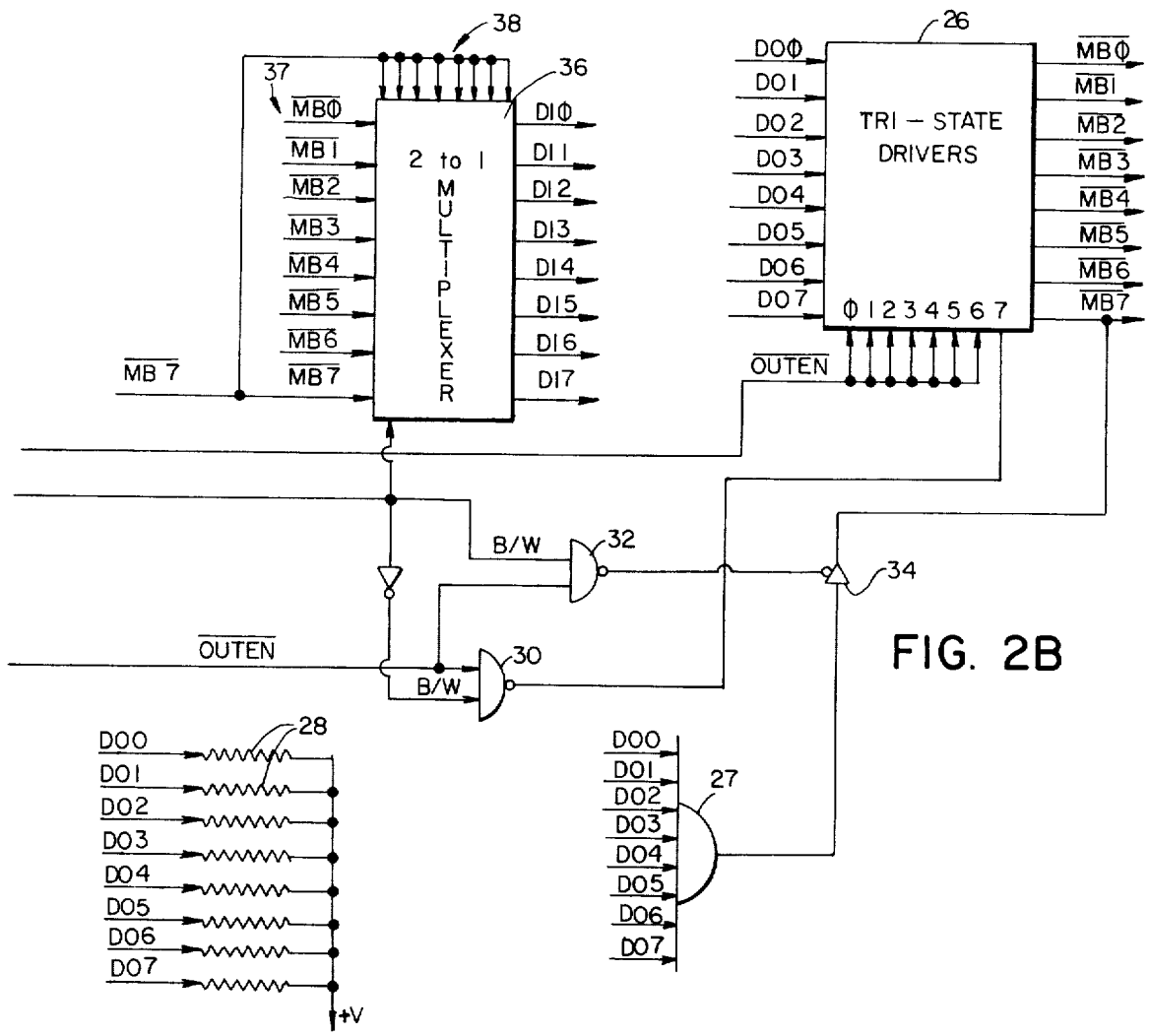
FIG. 2B

RANDOM ACCESS MEMORY WITH BIT OR BYTE ADDRESSING CAPABILITY

BACKGROUND OF THE INVENTION

This invention relates to random access memories for electronic data processing systems, and deals more particularly with such a memory capable of handling data either in parallel fashion as multi-bit words or bytes or as individual bits.

Memories used in data processing systems are commonly structured to handle data to be stored or retrieved in the form of eight-bit, twelve-bit or other multi-bit words or bytes. Such memory structure is usually desirable since the data involved generally is of such complexity as to require numerous bits for its expression in binary form. Recently, however, data processing systems have been used in programmable controllers used to control industrial processes, machine tools, power stations and the like wherein various sensors are monitored and, from the information so obtained, various output devices are controlled in accordance with a given logic scheme programmed into the controller. In turn, in many applications of programmable controllers, many of the sensors and output devices are two-state devices, such as an electric switch, an electrical solenoid, or an hydraulic cylinder, the state of which (open or closed, energized or de-energized, etc.) may be represented by either the high or low value of a single binary data bit. In such a situation, where information concerning the status of a large number of two-state peripheral devices is to be stored, the use of a memory capable of handling only multi-bit words is inefficient either as to the usage of memory space, to time requirements or to both.

The general object of this invention is, therefore, to provide a random access memory for an electronic data processing system particularly well adapted for use in applications requiring the storage of both multi-bit words and of single bits of data representing the status of a word corresponding plurality of two-state peripheral devices. More particularly, the object of this invention is to provide such a memory which is readily conditioned by appropriate control signals to read or write data either as groups of bits handled in parallel to define multi-bit words or as individual bits each constituting, in effect, a one-bit word.

A further object of this invention is to provide a random access memory of the foregoing character which is readily implemented from standard memory chips and other standard integrated circuit components and which may be made in the form of a plug-in card usable with other similar cards to provide a total memory having a capacity readily varied to suit the particular application at hand.

Other objects and advantages of the invention will be apparent from the following description and drawings and from the claims forming a part hereof.

SUMMARY OF THE INVENTION

The invention resides in a random access memory comprised of a plurality P of bit memory units or chips each having N address terminals and a corresponding plurality ($2^N$) of addressable chip locations or cells at each of which one bit of binary data may be stored. A chip addressing means is provided which enables any one of the memory chips to be addressed or selected by incoming chip address signals. An incoming control line provides a binary signal one state or which constitutes a "bit mode" addressing signal and the other state of which constitutes a "word mode" addressing signal. A means responsive to the "word mode" signal enables all of the memory chips during word mode addressing so that when the same chip location address signals are thereafter simultaneously applied to all of the chips in parallel access is gained to a corresponding plurality P of bit locations for reading or writing a P-bit word from or to P lines of an associated data bus. Another means responsive to the "bit mode" signal enables, during bit mode addressing, only the one memory chip addressed by the chip addressing means. In a bit addressing mode write operation, the one bit of data to be written appears on one line of the associated data bus and is applied to the data input terminals of all the memory chips. All memory chips are also supplied with the same address signals, but only the one enabled chip writes the one bit of input information and stores it at the addressed location. During a bit addressing mode read operation, the same address signals are supplied to all memory units but only the enabled one is accessed. All of the data output terminals of the memory chips are, in this operation, connected to a single one of the lines of the data bus so that the one data bit stored at the addressed chip location of the selected chip is transferred to that one data bus line.

BRIEF DESCRIPTION OF THE DRAWINGS

FIG. 1 is a schematic diagram illustrating a total random access memory comprised of a number of memory cards each embodying the present invention.

FIGS. 2a and 2b when placed side-by-side as shown in FIG. 3 form a single figure, hereinafter referred to as FIG. 2, which is a schematic diagram illustrating one of the memory cards of FIG. 1.

FIG. 3 is a diagram illustrating the manner in which FIGS. 2a and 2b are arranged to form FIG. 2.

DETAILED DESCRIPTION OF THE PREFERRED EMBODIMENT

Figures 2A, 3:
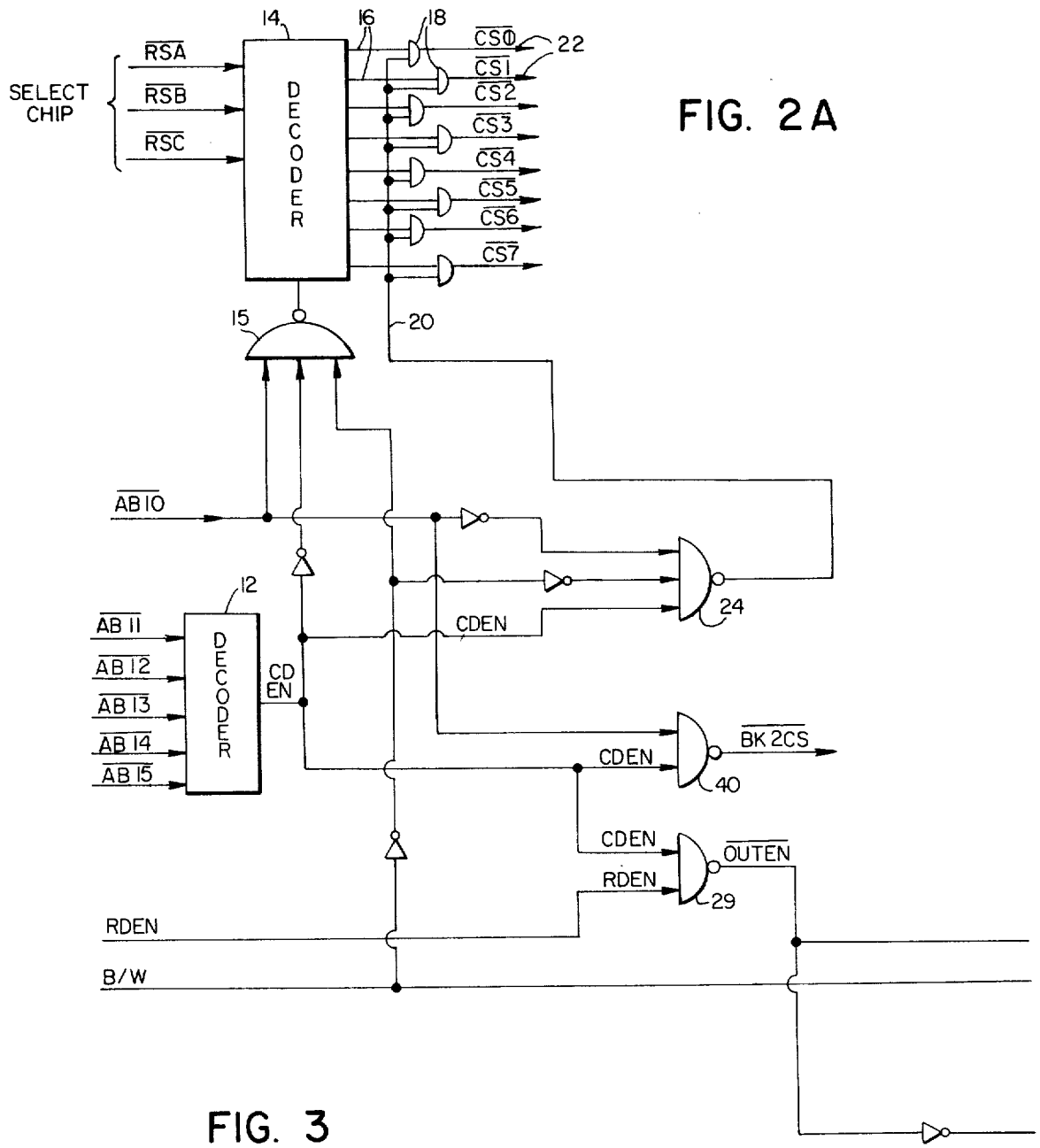

FIG. 1 shows a total random access memory comprised of N plug-in cards each having two memory banks (Bank 1 and Bank 2) each capable of storing 1,024 eight-bit words. Through its plug-in connection, each card is connected to an address bus having eight lines for transmitting to the card and in parallel eight address bits identified as $\overline{AB\phi}$ to $\overline{AB7}$. Each card also connects to a two-way data bus having eight lines for transmitting in parallel eight bits identified as $\overline{MB\phi}$ to $\overline{MB7}$. Finally, each card is also connected to a number of control lines providing the control signals indicated in FIG. 1 for controlling the operation of each card.

It will be understood that the total random access memory of FIG. 1 is a part of a data processing system such as may be used, for example, in a programmable controller, the address bus, data bus and control lines carrying signals between the illustrated memory cards and other components of the system. In a programmable controller application, much of the information stored by the memory may, as mentioned previously, involve the status of two-state peripheral devices, which status of each device may be represented by a single binary bit. Therefore, in accordance with the invention, at least one bank of the total memory is structured to permit either handling of information in eight-bit words or byte form or in single bit form. In particular, in the illustrated case Bank 1 of each card is provided with both multi-bit word and single bit addressing capability. On the other hand, Bank 2 of each card is provided with word addressing capability only. Thus, the invention resides primarily in the structure and operation of Bank 1 of each card as described in more detail hereinafter in connection with FIG. 2.

The specific embodiment of the invention illustrated by the drawings and described herein is not, however, intended to be limiting of the invention and various details of it may be varied widely without departing from the invention. For example, the number of cards making up the total memory, the number of banks on each card, the number of addressable locations and the word size of each bank, the bit capability of the address and data busses, and the number of banks provided with both word addressing and bit addressing capability are factors not essential to the invention and may be varied as needed to suit various different applications.

Turning to FIG. 2, this figure shows the arrangement of components making up one of the memory cards of FIG. 1. Each of the two banks of the card is comprised of eight memory units or chips (chip $\phi$ to 7) each having 1,024 locations or cells at each of which one binary bit of information may be stored. Each chip has ten address terminals to which address signals $\overline{AB\phi}$ to $\overline{AB9}$ are applied to select or address a given one of the 1,024 chip locations.

Each chip also has a chip select terminal to which a chip select signal is applied to enable that chip. In Bank 1 the signals appearing on the chip select terminals for enabling the chips are identified respectively as $\overline{CS\phi}$ to $\overline{CS7}$. In Bank 2 the chip select terminals of all eight chips are connected in parallel so that the same enabling signal $\overline{BKC2S}$ when present appears at each of the chip select terminals.

In addition to the terminals mentioned above, each chip of each bank further includes a data input terminal, a data output terminal and a write terminal. The signals supplied to the data input terminals are identified as $DI\phi$ to $DI7$, the signals appearing at the data output terminals are identified as $DO\phi$ to $DO7$. When present, a $\overline{WRAM}$ signal is applied to the write terminal of all of the chips. When a chip is enabled by an enabling signal at its chip select terminal, the signal stored at the chip location addressed by the address signals applied to its address terminals appears at the associated data output terminal, assuming that no $\overline{WRAM}$ signal appears at the write terminal. If a $\overline{WRAM}$ signal does appear at the write terminal while the chip is enabled, then the signal appearing at the associated data input terminal is written into the addressed chip location.

There are sixteen address lines in the address bus. Ten of these lines are connected in parallel to the corresponding address terminals of all the chips of both Bank 1 and Bank 2. Five ($\overline{AB11}$ to $\overline{AB15}$) are used to select a card from the plurality of cards which may be included in the total memory (thereby permitting a maximum of thirty-two cards to be included in the total memory) and one ($\overline{AB1\phi}$) is used to provide a bank select signal to select between the two memory banks of the selected card.

The decoder 12 decodes the card select signals $\overline{AB11}$ to $\overline{AB15}$ and if these signals address the illustrated card, the decoder produces the output signal CDEN. CDEN being high indicates that the card in question is the one selected by the card select address signals $\overline{AB11}$ to $\overline{AB15}$ and in the following discussion, it will be generally assumed that the card described is the selected one with CDEN being high.

Assuming that the illustrated card of FIG. 2 is the selected one, assume further that the input signal $\overline{AB1\phi}$ is low to indicate a selection of Bank 1. This bank may be addressed in either a "bit mode" or "word made", and the selection of such mode is controlled by the B/W signal appearing on the associated control line. When B/W is high bit mode addressing is dictated, and when B/W is low (W/B high) word mode addressing is dictated.

Taking now that the illustrated card and its Bank 1 have been selected, assume further that "bit mode" addressing is selected by the appearance of the control signal B/W in its high form. When bit mode addressing is used, the data bit in question is transferred to or from the memory by the $\overline{MB7}$ line of the data bus. The B/W signal together with $\overline{AB1\phi}$ and CDEN enable, through the NAND gate 15, the illustrated decoder 14 which now also is supplied with three chip select signals $\overline{RSA}$, $\overline{RSB}$ and $\overline{RSC}$. The decoder 14 decodes the chip select input signals to apply a low signal to a selected one of eight output lines 16, 16 assigned respectively to the eight chips of Bank 1. Each line 16 serves as an input to an associated AND gate 18 also having as an input the signal on the line 20.

The output of each AND gate 18 is a line 22 connected to the chip select terminal of the associated chip of Bank 1. At this time, the signal appearing on the line 20 is high due to the low value of the W/B signal applied to the NAND gate 24. Therefore, the low signal which appears on the one selected line 16 is transferred, through its associated gate 18, to its associated line 22 to cause the signal on that line 22 to also go low. That is, only the signal on a selected one of the lines 22, 22 goes low and, therefore, only the associated one of the eight chips $\phi$ to 7 of Bank 1 is enabled by such signal.

Assuming now that one chip of Bank 1 has been selected or enabled as discussed above, the second period of data bus usage may involve either a READ or WRITE operation. Assuming first a READ operation, and assuming that address signals are now applied to the ten address terminals of each chip, the single bit stored at the addressed chip location of the selected chip appears at its data output (DO) terminal. The eight data output terminals of Bank 1, and likewise of Bank 2, are connected as inputs to both a set 26 of tri-state drivers and an AND gate 27. The corresponding ones of the data output terminals of Bank 1 and Bank 2 are directly connected to one another and all unselected data outputs of the chips of Bank 1 and Bank 2 are held high by each such output being connected to a source of high signal voltage through an associated pull-up resistor 28. Each tri-state driver of the set 26 has its input terminal connected to the two associated data output terminals of Bank 1 and of Bank 2. If both such data output terminals remain high, the signal to the tri-state driver is high. If one such data output terminal goes low, the signal to the tri-state driver also goes low. The outputs of the eight tri-state drivers of the set 26 are connected to the eight lines of the data bus. The enabling terminals $\phi$ to 7, respectively, enable the eight tri-state drivers of the set when a low value enabling signal appears at each terminal.

At the time the single bit from the one selected chip of Bank 1 is to be read onto the data bus, a RDEN signal appears on the associated control line. This signal in conjunction with the CDEN signal produces an $\overline{\text{OUTEN}}$ signal at the output of NAND gate 29. The $\overline{\text{OUTEN}}$ signal is applied to the first seven enabling terminals ($\phi$ to 6) of the set of tristate drivers, but enabling terminal 7 is supplied with a high signal from the NAND gate 30, thereby disconnecting the number 7 tri-state driver input from the $\overline{\text{MB7}}$ data bus line. At the same time, the presence of the $\overline{\text{OUTEN}}$ signal in conjunction with the B/W signal produces a low output from the NAND gate 32 which turns on the tri-state driver 34, thereby connecting the output of AND gate 27 to the data bus line $\overline{\text{MB7}}$. By way of example, assume that the selected chip of Bank 1 is chip 7. If the bit stored at the addressed bit location of chip 7 is low valued, then the DO7 input to AND gate 27 goes low, all other inputs remain high, and the output of the AND gate, which is supplied to the $\overline{\text{MB7}}$ line through the tri-state driver 34, is low in keeping with the low value of the stored bit. On the other hand, if the bit stored at the selected location of chip 7 is high, the DO7 input, as well as all other inputs, to AND gate 27 is high, and the output from the gate, as supplied to the $\overline{\text{MB7}}$ line, is accordingly likewise high.

In the case where a single bit of data is to be read into Bank 1 during a memory cycle in the bit addressing mode, the bit to be written appears on the data bus line $\overline{\text{MB7}}$. All of the eight data bus lines $\overline{\text{MB}\phi}$ to $\overline{\text{MB7}}$ are connected respectively to one set 37 of eight input terminals of a two line to one line multiplexer 36 and the $\overline{\text{MB7}}$ data bus line is connected to all of a second set of eight input terminals indicated generally at 38. In response to the B/W signal applied to its selected terminal, the multiplexer 36 is conditioned to connect its second set of input terminals 38 to its output terminals which in turn are connected respectively to the data input terminals DI$\phi$ to DI7 of the eight chips of Bank 1 (and of the eight chips of Bank 2). Thus, the one bit of data appearing on the data bus line $\overline{\text{MB7}}$ is supplied to all eight of the data input terminals of the eight chips of Bank 1 during bit mode addressing. The writing of the bit into the addressed location of the selected chip occurs upon the appearance of the $\overline{\text{WRAM}}$ signal on the associated control line, such $\overline{\text{WRAM}}$ signal being supplied simultaneously to all of the write terminals of the eight chips of Bank 1 and of the eight chips of Bank 2.

Considering now the case of "word mode" addressing, this mode of addressing is dictated by the B/W signal going low. This disables the decoder 14 making all of its output lines 16 go high. It also causes the output of AND gate 24 to go low supplying a low signal to the line 20 thus applying a low input to all of the AND gates 18, 18, and thereby making each of the lines 22, 22 low and in turn enabling all of the chips $\phi$ to 7 of Bank 1 by applying low enabling signals to their chip select terminals $\overline{\text{CS}\phi}$ to $\overline{\text{CS7}}$.

The low state of the B/W signal also holds high the output from the AND gate 32 and thus holds off the tri-state driver 34. Further, it conditions the two line to one line multiplexer 36 to connect its first set 37 of input terminals to its output terminals thereby connecting the bus lines $\overline{\text{MB}\phi}$ to $\overline{\text{MB7}}$ respectively to the data input terminals $\overline{\text{DI}\phi}$ to $\overline{\text{DI7}}$ of Bank 1 (and of Bank 2).

During a read operation in the word addressing mode, an RDEN signal appears as a read enabling signal. This produces an $\overline{\text{OUTEN}}$ signal applied directly to the first seven enabling terminals $\phi$ to 6 of the set of tri-state drivers 26. Another enabling signal is applied to the number 7 enabling terminal from the gate 30. Thus, the eight data output terminals DO$\phi$ to DO7 of Bank 1 (and of Bank 2) are connected respectively to the eight lines $\overline{\text{MB}\phi}$ to $\overline{\text{MB7}}$ of the data bus, and the eight-bit word appearing at the data output terminals of Bank 1 as a result of the address signals applied in parallel to the eight chips of that bank is transferred to the data bus. During a write operation, the eight bits supplied to the eight data input terminals of Bank 1 from the data bus lines through the two line to one line multiplexer 36 are written into the addressed locations of the associated chips of Bank 1 upon the appearance of the $\overline{\text{WRAM}}$ signal supplied simultaneously to all chips.

As mentioned, Bank 2 of the illustrated FIG. 2 memory is not, by way of example, designed for optional bit mode addressing and instead is intended for word mode addressing only. Therefore, the chip select terminals of all of the chips of Bank 2 are connected in common to the output of NAND gate 40 which supplies a Bank 2 chip selecting signal $\overline{\text{BK2CS}}$ when $\overline{\text{AB1}\phi}$ goes high to indicate a selection of Bank 2, assuming that at that time CDEN is high to indicate a selection of the card in question. Since Bank 2 has only word mode addressing capability, when that bank is selected, the B/W signal remains low to dictate such word mode addressing. Thus, at all times during any operation involving Bank 2, the two line to one line multiplexer 36 is conditioned to connect the data bus lines $\overline{\text{MB}\phi}$ to $\overline{\text{MB7}}$ respectively to the data input terminals DI$\phi$ to DI7, and the tri-state drivers 26 are set upon the appearance of the RDEN signal to connect the data output terminals DO$\phi$ to DO7 respectively to the data bus lines $\overline{\text{MB}\phi}$ to $\overline{\text{MB7}}$. Accordingly, when Bank 2 is selected, for a writing operation upon the appearance of a $\overline{\text{WRAM}}$ signal, the eight bits appearing on the data bus lines will be read into the addressed locations of the eight chips of Bank 2 through the multiplexer 36, and for a reading operation when the RDEN signal appears the eight bits stored at the addressed locations of the eight chips of Bank 2 will be transferred to the data bus lines through the tri-state drivers 26.

I claim:

1. A random access memory operable in either a "word mode" in which a plurality of bit locations are accessed in parallel during a memory cycle or a "bit mode" in which one bit location is accessed during a memory cycle, said memory comprising: a plurality P of bit storage units each having $2^N$ addressable bit locations at each of which locations one bit may be stored, each of said bit storage units having N address terminals to which a set of N binary signals may be supplied to selectively address any one of its bit locations, a plurality N of bit location address lines, unit addressing means for addressing any selected one of said storage units, means responsive to a "word mode" control signal for simultaneously enabling all P of said bit storage units and for at the same time simultaneously supplying the set of bit location address signals appearing on said address lines to the address terminals all P of said storage units to gain parallel access to a plurality P of bit locations, and means responsive to a "bit mode" control signal for causing only the one of said storage units selected by said unit addressing means to be simultaneously enabled and supplied with the set of bit location address signals appearing on said address lines to gain access to only one bit location.

2. A random access memory as defined in claim 1 further characterized by a data bus having P lines, means responsive to said "word mode" signal for electrically connecting each of said P lines of said data bus to a respectively associated one of said storage units to transfer a P bit word between said data bus and said storage units, and means responsive to said "bit mode" signal for electrically connecting one of said lines of said data bus to all of said storage units to transfer a one-bit word between said data bus and the enabled one of said storage units.

3. A random access memory as defined in claim 1 further characterized by each of said storage units having a data input terminal, a data output terminal, a unit enable terminal and a write terminal, and each of said storage units being of the type that when enabled by an enabling signal applied to its enable terminal the bit stored at the bit location addressed by the bit location address signals applied to its address terminals appears at its data output terminal and is updated by the bit appearing at its input terminal during the appearance of a write signal at its write terminal, a data bus having P lines, means responsive to said "word mode" signal for electrically connecting each of said P lines of said data bus to the data/input terminal of a respectively associated one of said storage units, means responsive to said "bit mode" signal for electrically connecting one of said P lines of said data bus to the data input terminals of all of said storage units, means responsive to said "word mode" signal and an output enabling control signal for electrically connecting said P lines of said data bus to their respectively associated data output terminals of said storage units, and means responsive to the simultaneous occurrence of said "bit mode" signal and said output enabling control signal for electrically connecting one of said lines of said data bus to the data output terminals of all of said memory units.

4. A random access memory as defined in claim 1 further characterized by said unit addressing means including a decoder for decoding a plurality of unit select signals appearing on a corresponding plurality of control lines into a one out of P signal selecting an associated one of said units.

5. A random access memory as defined in claim 1 further characterized by means continuously connecting said bit location address lines in parallel to corresponding ones of said address terminals of all P of said storage units so that whenever bit location address signals appear on said address lines all P of said storage units are identically and concurrently addressed by such bit location address signals, and by said means responsive to a "bit mode" control signal for causing only the one of said storage units selected by said unit addressing means to be simultaneously enabled and supplied with the set of bit location address signals appearing on said address lines comprising means responsive to a "bit word" control signal for enabling only the one storage unit addressed by said unit addressing means.

* * * * *